Aug. 6, 1946. L. J. WACKETT 2,405,383
MEANS FOR AIMING GUNS MOUNTED IN AIRCRAFT
Filed Oct. 13, 1941 2 Sheets-Sheet 1
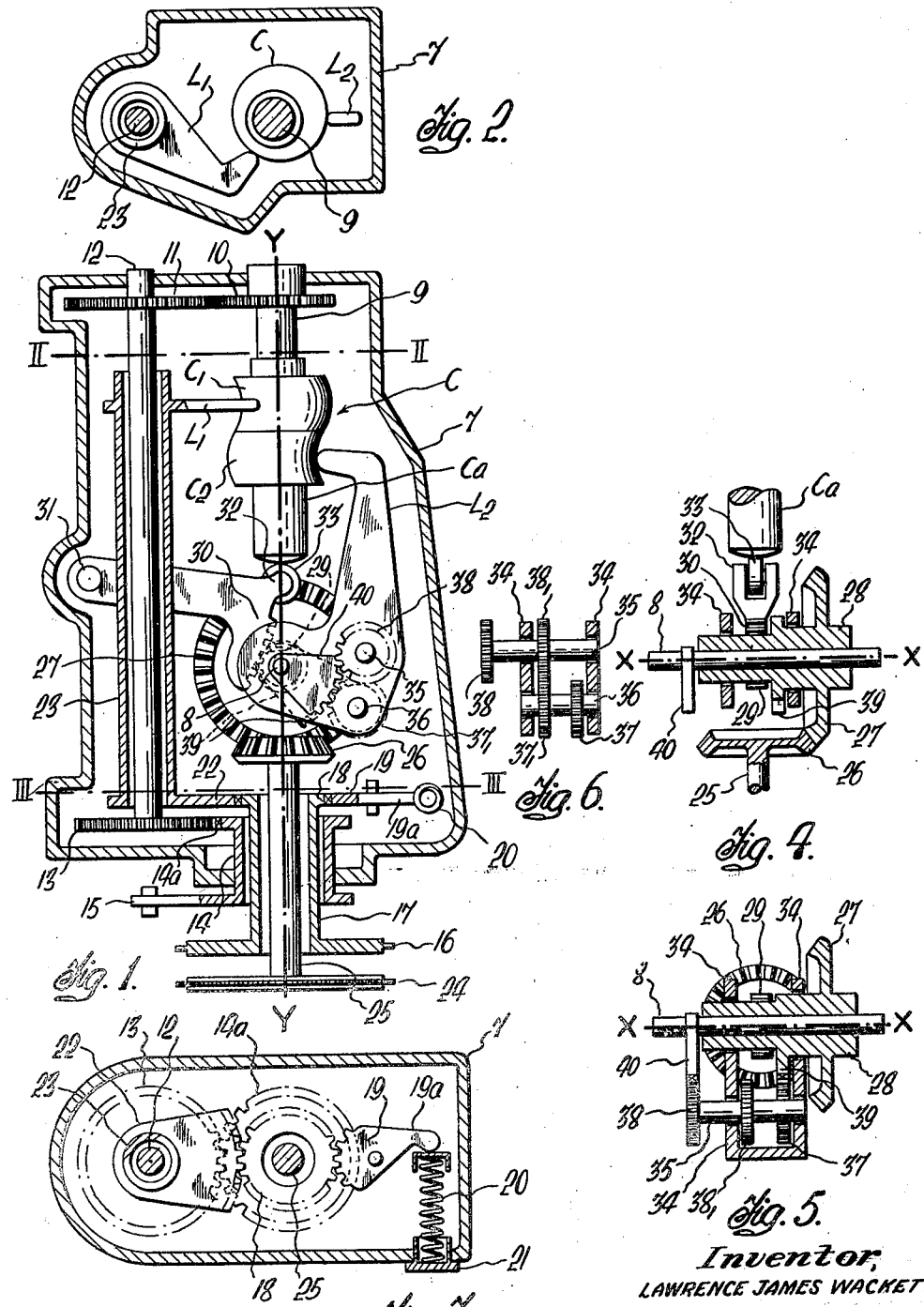
Inventor,
LAWRENCE JAMES WACKETT
By Young, Emery & Thompson
Attorneys Aug. 6, 1946.　　　　L. J. WACKETT　　　　2,405,383
MEANS FOR AIMING GUNS MOUNTED IN AIRCRAFT
Filed Oct. 13, 1941　　　2 Sheets-Sheet 2

Inventor
LAWRENCE JAMES WACKETT

Patented Aug. 6, 1946

2,405,383

UNITED STATES PATENT OFFICE 2,405,383

MEANS FOR AIMING GUNS MOUNTED IN AIRCRAFT

Lawrence James Wackett, Brighton, Victoria, Australia

Application October 13, 1941, Serial No. 414,886
In Australia October 30, 1940

7 Claims. (Cl. 33—49)

This invention relates to the aiming of guns mounted in aircraft, more especially to correcting the aiming of sight controlled guns, when they are trained to fire in any direction that is oblique to the line of flight.

It has for many years been the generally adopted practice in connection with aircraft mounted guns, to apply corrections for compensating deflection of the bullets or other projectiles due to the speed of the aircraft and also to the effects of gravity. The guns are trained both in azimuth or train and in elevation by means of control mechanism which may be operated by hand or by power or electrical means. The sighting devices are operatively connected to the guns by mechanical, hydraulic or electrical transmission means and are thereby directed to reproduce the motion in azimuth and elevation imparted to the guns by the control mechanism.

Deflection of the projectiles arising from the true speed of flight of the aircraft is assumed to be unaffected by the air and is generally compensated for by a simple course crank that is adjustable for the true speed of the aircraft. The effects of gravity are generally counteracted by a simple tangent elevation that is adjustable for an assumed range.

While such corrections may be considered as reasonably satisfactory for comparatively slow moving aircraft they have been found to be quite inadequate in the case of modern high speed aircraft. With high flying speeds the deflection due to the effects of the air upon the bullets or projectiles assumes considerable proportions and cannot be compensated for by the two known corrective factors before referred to with the result that accurate aiming cannot at present be assured.

The present invention seeks to remedy this defect and for this purpose it contemplates applying an additional correction which will compensate for the effects of air velocity upon the projectiles.

It is also desirable that other errors in aiming likely to arise from various causes such as the effects of air density and the motion of target aircraft should be compensated.

The corrections necessary to compensate for all such errors can be computed and summated so as to form a resultant correction, which is capable of being applied in addition to the two aforementioned corrections which counteract the effects of the speed of the gunner's aircraft and of gravity. The additional or resultant correction is resolved into two components and applied as a separate correction to the angle of azimuth and a separate correction to the angle of elevation, these component corrections being applied by the introduction into the motion transmitting means between the guns and the sights of means to apply such corrections.

The invention will be described and explained at greater length hereinafter with reference to the accompanying drawings which illustrate diagrammatically one way in which the invention may be carried into effect.

Referring to the drawings which form part of this specification:

Figure 1 is a part sectional elevation showing one embodiment of the invention.

Figure 2 is a sectional view taken approximately on line II—II of Figure 1.

Figure 3 is a sectional view taken approximately on line III—III of Figure 1.

Figure 4 is a sectional elevation of a shaft and gearing as seen in Figure 1.

Figure 5 is a sectional plan of the parts seen in Figure 4.

Figure 6 is an elevation of other shafts and gearing as seen in Figure 1.

Figure 7:
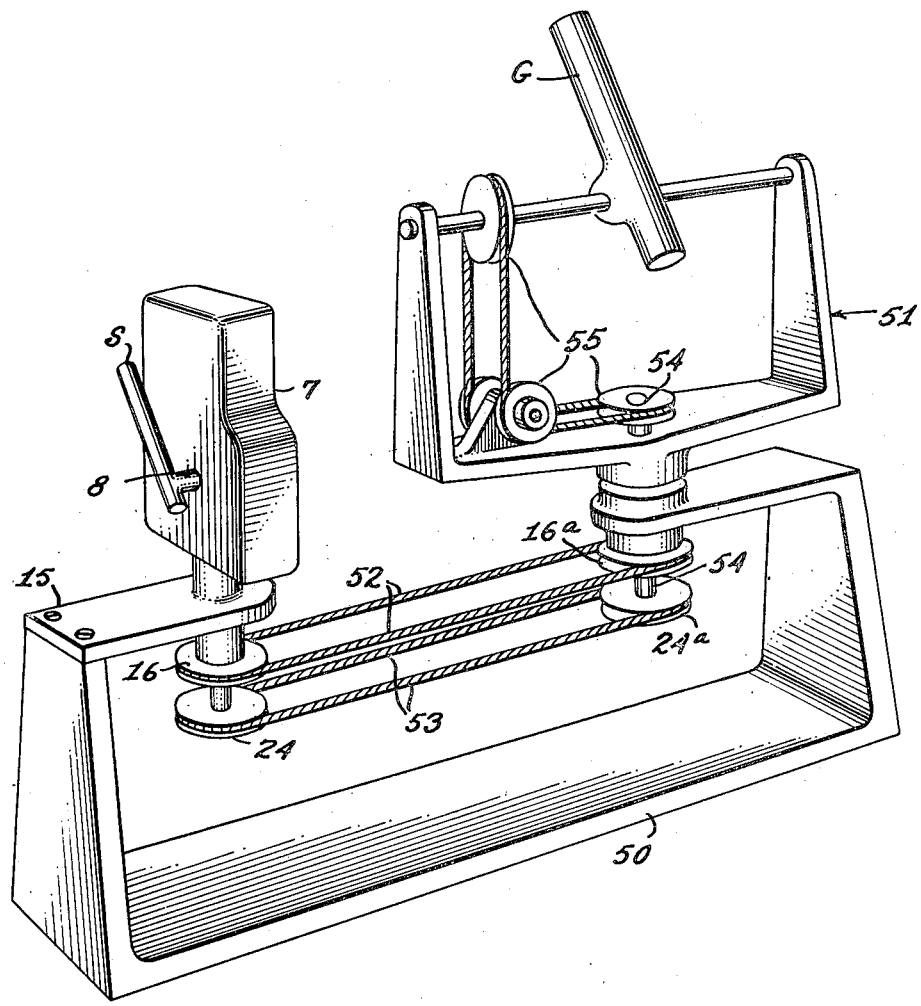
Fig. 7 is a diagrammatic view illustrating an assembly comprising a gun, a sight, the correcting device and motion transmitting means.

The gun sights which may be of any known or suitable kind, and may be duplicated for convenience, are shown in Figs. 1 to 6 but they are assumed to be mounted upon a casing 7 which is free to turn about the azimuth axis represented by Y—Y in Figure 1. This axis coincides with one of the principal axes of the aircraft. A sight S is depicted purely diagrammatically in Fig. 7.

Through the casing 7 there extends a shaft 8 which is free to turn about the axis of elevation represented by X—X in Figures 4 and 5. Operative connections such as levers, rods or the like (not shown except diagrammatically in Fig. 7) extend between shaft 8 and the sights so that the latter will be moved in elevation in accordance with the turning movements of shaft 8.

According to the illustrated embodiment, the sight correcting means includes a duplex or dual function cam C, which is introduced into the motion transmitting mechanism that extends from the guns to the sights. The term "duplex or dual function" is employed to denote that the cam has two working faces $C_1$, $C_2$ of such form as to exercise one correcting function by relative rotation or circumferential movement, and another correcting function by relative axial or lengthwise movement in relation to two cam followers or feelers exemplified by levers $L_1$, $L_2$ that contact with different portions of the cam.

The cam is mounted non-rotatably upon a spindle 9, coincident with the azimuth axis Y—Y, and is free to slide lengthwise of the spindle 9. The working face $C_1$ of the cam co-operates with lever $L_1$ to apply the correction in azimuth while the other working face $C_2$ of the cam co-operates with lever $L_2$ to apply the correction in elevation.

The contour of the working faces of the cam, will depend primarily upon the nature of the variable factors that are to be compensated for and also upon the conditions under which the aircraft is to operate. The particular contour to be adopted for a cam for any particular aircraft does not form any part of the invention but will be determined by appropriate calculations based upon data supplied to the designer by government or other authority. However it may be mentioned that, generally speaking, the contour of the cam is determined as follows: The corrections desired to be made to the angle of azimuth and the angle of elevation are computed from data obtained for the particular aircraft and guns to be used and are tabulated against angles of azimuth and elevation. For instance, when shooting at an angle 20° in azimuth measured to port and 20° in elevation above the horizontal it may be desired to make a correction to the aim in azimuth of 1° plus to port and 2° plus to elevation. If the cam were a true cylinder the corrections would be zero, but if the surface of the cam at the points of contact of the two followers $L_1$ and $L_2$ is varied by the correct amounts, then corrections of the amounts stated will be automatically applied whenever the guns are aimed in the stated direction. If the whole field of fire is explored, and the surface of the cam suitably formed, then any desired system of corrections can be applied over the entire field of fire.

The cam spindle 9 is connected by toothed gears 10, 11, shaft 12, gear 13 and toothed face 14a to a sleeve 14 that is concentric about axis Y—Y and is fixed in azimuth relative to the aircraft by being secured to some suitable structual part of the aircraft as by means of the arm 15. In Fig. 7 arm 15 is assumed to be attached to one end of a base mounting bracket 50 which supports at its other end a swivel mounting 51 for gun G. The cam is thus fixed in azimuth in relation to the aircraft, while the casing 7 moves in azimuth or, in other words, turns about axis Y—Y due to rotation of the sprocket wheel 16, which is assumed to be connected by a driving chain or belt 52 with another sprocket wheel 16a of the swivel mounting 51 as in Fig. 7.

Sprocket wheel 16 has an upstanding sleeve 17 concentric about axis Y—Y, that projects into casing 7 and is provided at its upper end with a toothed gear 18 enmeshed at one side of a quadrant gear 19 having a stem 19a acted upon by compression spring 20 that bears, at the end remote from stem 19a, against a fixed abutment represented by a plug 21 screwed into casing 7. The toothed gear 18 is also enmeshed by a quadrant gear 22 outstanding from the lower end of a hollow shaft 23 from which the cam lever $L_1$ outstands.

By such an arrangement of parts the casing 7 may be said to be differentially coupled to the sprocket wheel 16 so that the casing will turn with the wheel about axis Y—Y but the motion of the casing will be increased or decreased in relation to that of the sprocket 16 according to the turning motion imparted by the upper portion $C_1$ of cam C to lever $L_1$, and transmitted by hollow shaft 23 to gear 22. The locking action normally provided by the gears 18, 19 and 22 is thus relaxed to permit of relative rotary motion between the casing and the sprocket, the direction and extent of which depends upon the contour of the upper part of cam C. Thus the position of the casing 7 relative to sprocket 16 is automatically varied and a sighting correction in azimuth is applied to the guns according to the particular contour of the upper portion of the cam.

The cam C is moved lengthwise or axially in conformity with the motion in elevation of the guns. For this purpose a sprocket wheel 24 carried by a shaft 25 that is coincident with axis Y—Y is assumed to be driven by a chain, belt or the like 53 from another sprocket wheel 24a (Fig. 7). This sprocket wheel is fast with a shaft 54 which moves synchronously with the axis of elevation of gun G and is rotated, as the gun moves in elevation, through medium of the driving means 55. Shaft 25 is geared, as by the bevel gears 26, 27 with a sleeve 28 that is free to turn about shaft 8 and has a pinion 29 enmeshed by a toothed quadrant 30 that rocks about pin 31 and has a spur 32 carrying a roller 33 for contacting a depending extension $C_a$ of cam C.

Lever $L_2$ may be bifurcated at its inner end and the resulting plate like portions 34 are apertured to rotatably encircle sleeve 28, and to support spindles 35, 36 upon which planet pinions 37, $37_1$, and 38, $38_1$ are respectively mounted. planet pinion 37 meshes with a sun gear 39 fast on sleeve 28 while planet pinion 38 meshes with a toothed gear 40 that is fast on shaft 8. The bifurcated end of lever $L_2$ and the train of toothed gearing referred to thus constitute a differential or epicyclic coupling between lever $L_2$ and shaft 8 and sleeve 28 with the result that the arc and rate of turning of shaft 8 will exceed or fall short of that of sleeve 28, which turns in conformity with the motion in elevation of the guns, to an extent which is determined and controlled by the lower portion of the cam so that the desired sighting correction will be applied to the angle of elevation of the guns.

The total effect upon aiming is that the sights will be directed in such a manner that they will, in general, vary both in azimuth and in elevation from the direction assumed by the guns. The magnitude of the variation will be controlled by the double cam and is such as to correct the aiming by compensating for the errors which would otherwise be created.

Provision can be made to gear the cam to move through only one half, one third, or one quarter, of the arc traversed by the guns in azimuth so that the whole of the corrections, for instance, for a motion of the guns through 180° of azimuth, can be formed upon an arc of 90° of the cam. By indexing the cam to a suitable position, compensation can be provided for a second, third or greater number of sets of conditions as to air velocity, density or motion of target aircraft. To effect a change to another set of conditions, the cam and its spindle 9 can be raised to permit them to be turned to bring another portion of the cam surface into operative alignment with the cam levers, whereupon the cam and spindle are lowered into their normal position. In this manner the sighting corrections can be readily changed to apply to a number of chosen sets of tactical conditions while combat in the air is in progress.

It is to be understood that the foregoing de-

Having now described my invention what I claim as new and desire to secure by Letters Patent is:

1. A device for correcting the angular relation between a gun flexibly mounted on an aircraft and a sight therefor, a casing angularly movable in train, a shaft pivoted in said casing for turning about a horizontal axis, said sight being fixed to move in elevation with said shaft, means connecting said casing and gun for synchronous movement in train, means connecting said shaft and gun for synchronous movement in elevation a cam pivoted in said casing, means mounting said cam for axial sliding movement, means maintaining said cam rotationally fixed relatively to the craft as the casing is trained, means sliding said cam axially as the sight is elevated, feelers engaging different portions of said cam and movable with the casing in train, connections operable by one feeler for superposing movements thereof on said train connecting means and connections operated by a second feeler for superposing movements thereof into said elevation connecting means.

2. A device according to claim 1, including a variable coupling and a differential coupling, in which the cam is a compound cam having two separate working faces each operating a feeler, said first mentioned feeler having connections effecting angular corrections in train by means of said variable coupling, said second feeler having connections effecting angular corrections in elevation by means of said differential coupling, each coupling being operatively connected to its respective feeler, and said connections effecting the desired corrections to the alignment of the sight in relation to the gun in accordance with the contours of the two working faces of the compound cam.

3. A device for correcting the angular relation between a gun flexibly mounted on an aircraft and a sight therefor, comprising a casing angularly movable in train, means connecting said casing and gun for synchronous movement in train, a shaft pivoted in said casing for turning about a horizontal axis, said sight being fixed to move in elevation with said shaft, means connecting said shaft and gun for synchronous movement in elevation, a cam pivoted in said casing, means maintaining said cam rotationally fixed relatively to the craft as the casing is trained, means sliding said cam axially as the sight is elevated, said cam having two working faces each of which is contoured to a form determined by the nature and extent of the errors to be corrected, a feeler engaging each working face and movable with the casing in train, connections operable by one feeler for effecting angular corrections in train of said gun relatively to said sight, and connections operable by a second feeler for effecting angular corrections in elevation of said gun relatively to said sight.

4. A device according to claim 3, and including a variable coupling device effecting the connection between the feeler effecting corrections in train, a gear fixed on the driving shaft of the casing in train, and two companion gears meshing with said first mentioned gear, one of the companion gears being mounted on a shaft which carries the feeler for effecting corrections in train and the other companion gear being resiliently urged in a direction to maintain the said feeler in contact with said cam by means of the gears.

5. A device according to claim 3, including a sleeve encircling the shaft to which the sight is fixed to move in elevation, means connecting said shaft to move the same in synchronous movement with the gun in elevation said means being geared to rotate the said sleeve and connections to convert rotary motion of said sleeve into axial sliding movement of the said cam.

6. A device according to claim 3, and including a sleeve encircling said shaft, a differential coupling gearing said sleeve to said shaft, said differential coupling comprising toothed gears fixed respectively to said sleeve and said shaft and planetary pinions carried by said second feeler and meshing respectively with said toothed gears on the sleeve and the shaft, said second feeler being in the form of a lever which is arranged to turn about said sleeve and carries spindles mounted parallel with said sleeve and shaft and having said planetary pinions fast thereon.

7. A device according to claim 3, and including a sleeve encircling said shaft, geared means connecting said sleeve to the means connecting said shaft to move in synchronous movement with the gun in elevation, and means consisting of a toothed pinion and a toothed rack or quadrant, to convert rotary motion of the sleeve into axial sliding movement of the said cam, such motion being synchronised with the motion of the gun in elevation.

LAWRENCE JAMES WACKETT.